United States Patent
Bittlingmaier

(10) Patent No.: US 12,556,075 B2
(45) Date of Patent: Feb. 17, 2026

(54) WHEEL SIDE

(71) Applicant: Kessler & Co. GmbH & Co. KG, Abtsgmünd (DE)

(72) Inventor: Günter Bittlingmaier, Aalen (DE)

(73) Assignee: Kessler & Co. GmbH & Co. KG, Abtsgmünd (DE)

( * ) Notice: Subject to any disclaimer, the term of this patent is extended or adjusted under 35 U.S.C. 154(b) by 215 days.

(21) Appl. No.: 18/234,956

(22) Filed: Aug. 17, 2023

(65) Prior Publication Data
US 2024/0178733 A1  May 30, 2024

(30) Foreign Application Priority Data
Aug. 24, 2022 (DE) .......... 102022121431.1

(51) Int. Cl.
| | |
|---|---|
| *H02K 11/22* | (2016.01) |
| *B60K 7/00* | (2006.01) |
| *H02K 11/225* | (2016.01) |
| *H02K 24/00* | (2006.01) |

(52) U.S. Cl.
CPC ........... *H02K 24/00* (2013.01); *B60K 7/0007* (2013.01); *H02K 11/225* (2016.01); *B60K 2007/0061* (2013.01)

(58) Field of Classification Search
CPC .. H02K 5/00; H02K 5/04; H02K 5/15; H02K 5/17; H02K 5/173; H02K 5/24; H02K 7/00; H02K 7/006; H02K 7/0007; H02K 7/11; H02K 7/116; H02K 7/14; H02K 11/00; H02K 11/21; H02K 11/22; H02K 11/225; H02K 11/30; H02K 24/00
See application file for complete search history.

(56) References Cited

FOREIGN PATENT DOCUMENTS

| | | |
|---|---|---|
| CN | 110588310 A | 12/2019 |
| DE | 202018003305 U1 | 7/2018 |
| DE | 102018222842 A1 | 6/2020 |
| EP | 3065273 A1 | 9/2016 |
| EP | 3795402 A1 | 3/2021 |
| EP | 3929011 A1 | 12/2021 |
| EP | 4155105 A1 | 3/2023 |
| JP | 2004101217 A | 4/2004 |
| KR | 1020220083480 A | 6/2022 |
| WO | WO2009081840 A1 * | 7/2009 |

(Continued)

*Primary Examiner* — Tran N Nguyen
(74) *Attorney, Agent, or Firm* — Dickinson Wright PLLC

(57) ABSTRACT

A wheel side comprises: an electric motor that comprises a stator and a rotor; a drive shaft that is connected to the rotor for a common rotation about an input axis so that a drive power generated by the electric motor can be output to further components of the wheel side via the drive shaft; and a resolver for detecting the angular position of the rotor, wherein the resolver comprises a stationary part and a rotary part and the rotary part of the resolver is connected to the rotor of the electric motor for a common rotation about the input axis. In this respect, the resolver is formed separately from the electric motor. Provision is furthermore made that the wheel side has a form-fitting element that is arranged eccentrically with respect to the input axis and that engages in a form-fitting manner into a hole formed at the rotary part, on the one hand, and into a hole formed at the rotor, on the other hand, to ensure a defined angular position of the rotary part relative to the rotor.

11 Claims, 2 Drawing Sheets

(56) References Cited

FOREIGN PATENT DOCUMENTS

Figure 1:
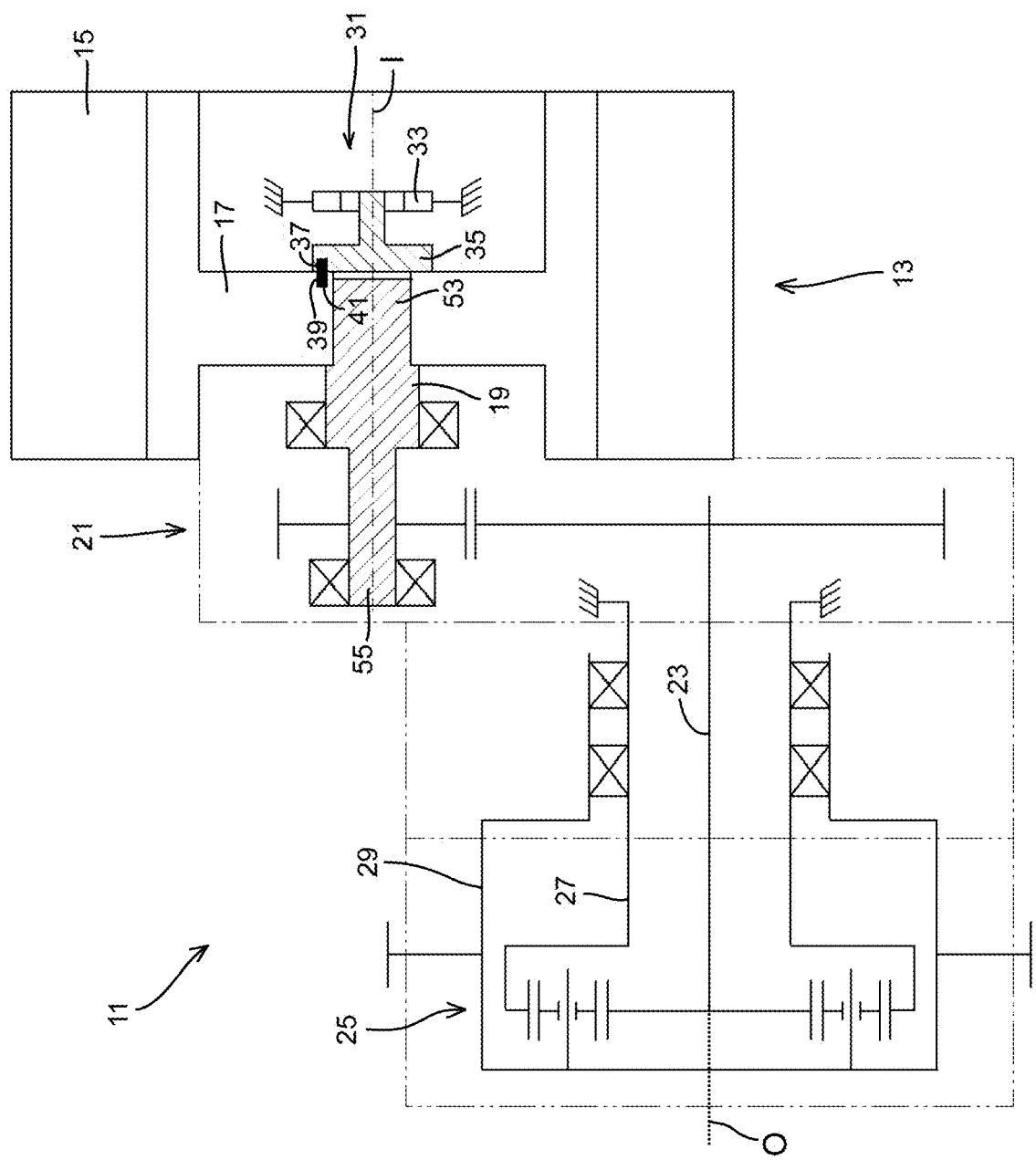

| WO | 2013077407 A1 | | 5/2013 |
|---|---|---|---|
| WO | WO2014188672 A1 | * | 11/2014 |
| WO | 2019004062 A1 | | 1/2019 |
| WO | WO2021095674 A1 | * | 2/2021 |
| WO | 2021180384 A1 | | 9/2021 |

* cited by examiner

WHEEL SIDE

The invention relates to a wheel side that comprises an electric motor having a stator and a rotor for generating a drive power. In such a wheel side, the drive power therefore does not have to be received from outside the wheel side, for example from a central motor of a vehicle, but the generation of the drive power is integrated into the wheel side. To be able to transmit the generated drive power from the electric motor to further components of the wheel side, in particular ultimately to a wheel hub of the wheel side, the wheel side comprises a drive shaft that acts as an output shaft of the electric motor and that extends along an input axis of the wheel side about which it is rotatable.

For the control of the electric motor, it is usually important to precisely monitor the angular position of the rotor and/or of the drive shaft connected thereto. Typically, a resolver is used for this purpose that continuously detects the angular position. In this respect, the resolver in turn has a rotor and a stator that are referred to as the rotary part and the stationary part in the following for conceptual differentiation from the rotor and the stator of the electric motor.

For the detection of the angular position, the resolver is coupled to the electric motor by mechanically connecting the rotary part of the resolver (possibly via the drive shaft) to the rotor of the electric motor so that the rotary part and the rotor rotate together. It is important in this respect that the orientation of the resolver and the electric motor relative to one another, in particular the angular position of the rotary part of the resolver relative to the rotor of the electric motor, is known very precisely so that not only a change in the angular position but also the absolute angular position of the rotor may be reliably detected.

The electric motor (possibly together with the drive shaft) often represents an assembly that is largely independent of the rest of the wheel side. As such, the electric motor as a whole is supported at a supporting structure, for instance a housing, of the wheel side and is only drive-effectively coupled to the rest of the wheel side. In this regard, the electric motor may also be largely independent of the rest of the wheel side with regard to its support. In such an electric motor, the resolver is often directly integrated.

In the case of a resolver integrated into the electric motor, the resolver may once be positioned comparatively precisely relative to the electric motor and coupled thereto. Furthermore, a calibration, in particular a software-side calibration, may then be carried out, whereby remaining deviations may be detected and permanently stored. This may then be considered when reading out the resolver in order to obtain a precise value for the angular position of the rotor of the electric motor.

However, it may also be expedient to make the electric motor less independent of the rest of the wheel side and not to integrate the resolver firmly into the electric motor. Reasons for this may result, for example, from specific limitations of the installation space. A less independent design of the electric motor and a design of the resolver separately from the electric motor may also make it possible, for instance in the event of maintenance, to reach parts of the wheel side with comparatively little effort to which access would otherwise be blocked.

An electric motor that is only indirectly supported, namely via the drive shaft, is described in CN 110588310 A, for example. The resolver is formed separately from the electric motor in this respect. Specifically, the resolver is located at one end of the axial extent of the drive shaft, while the drive shaft is connected to the rotor of the electric motor at the opposite end of its axial extent.

However, a separate design of the resolver also means that when installing the resolver into the wheel side (and, if necessary, on each further installation, for example after a temporary removal as part of maintenance), the angular position between the rotary part of the resolver and the rotor of the electric motor must be (re)set as precisely as possible and a calibration must subsequently be performed to detect the remaining deviations. If a resolver formed separately from the electric motor is only indirectly connected to the electric motor, it may furthermore be possible that the angular position is not precisely maintained due to disturbing influences, such as play or other tolerances, of one or more elements connecting the resolver to the electric motor.

It is an object of the invention to provide a wheel side of the initially mentioned kind which may be designed as comparatively compact, which offers a good accessibility to its components in this respect, and in which a high reliability for the detection of the angular position of the rotor of the electric motor is ensured in a simple manner.

The object is satisfied by a wheel side having the features of claim 1. Advantageous embodiments result from the dependent claims, the present description, and the Figures.

The wheel side in accordance with the invention comprises: an electric motor that comprises a stator and a rotor; a drive shaft that is connected to the rotor for a common rotation about an input axis so that a drive power generated by the electric motor may be output to further components of the wheel side via the drive shaft; and a resolver for detecting the angular position of the rotor, wherein the resolver comprises a stationary part and a rotary part and the rotary part of the resolver is connected to the rotor of the electric motor for a common rotation about the input axis.

In this respect, the electric motor may be configured in a generally known manner, in particular with respect to its mode of operation. The rotary movement of the rotor relative to the stator brought about by the electric motor is output by the electric motor via the drive shaft. Since the drive shaft is connected to the rotor for a common rotation, it rotates together with the rotor in the same direction and at the same speed about the input axis in each case. The drive shaft may connect the electric motor to a gear stage of the wheel side, for example. Ultimately, the drive power generated by the electric motor and output via the drive shaft may be transmitted to a wheel hub of the wheel side to drive a wheel possibly arranged thereat.

By means of the resolver, it may be monitored which angular position the rotor of the electric motor has relative to a specific stationary reference, in particular relative to the stator. The resolver is an electromagnetic angular position encoder that may generate and output a signal dependent on the angular position of its rotary part relative to its stationary part. The stationary part is therefore expediently arranged in a stationary manner, while the rotary part is connected to the rotor of the electric motor for a common rotation and may thereby be rotated about the input axis.

The connection of the rotary part to the rotor may generally take place by fastening means, such as screws. The connection then preferably takes place at a plurality of fastening points, in particular three or more fastening points, which are distributed in the circumferential direction around the input axis and at each of which a fastening means is provided. The fastening points may be substantially regularly distributed in this respect. However, their arrangement preferably does not have any rotational symmetry so that the rotary part and the rotor may be connected to one another for a common rotation, by the fastening means, at least substantially in only one angular position relative to one another. However, such a kind of connection, in particular a connection by means of screws, is usually not sufficient to ensure a defined angular position of the rotary part relative to the rotor, namely to mechanically predefine the angular position so precisely that a subsequent calibration, in particular a software-side calibration, of the angular position of the rotary part of the resolver relative to the angular position of the rotor of the electric motor is no longer necessary.

In accordance with the invention, the resolver is formed separately from the electric motor. The resolver is in particular not integrated into the electric motor such that the electric motor and the resolver have to be installed in the wheel side or removed from the wheel side as a common assembly. Rather, the resolver may advantageously be removed from the wheel side without necessarily having to remove the electric motor as well; conversely, when assembling the wheel side, the electric motor may be installed first and the resolver may subsequently be attached thereto. Furthermore, the resolver is preferably supported independently of the electric motor, in particular not supported at the electric motor.

Furthermore, provision is made in accordance with the invention that the wheel side has a form-fitting element that is arranged eccentrically with respect to the input axis and that engages in a form-fitting manner into a hole formed at the rotary part, on the one hand, and into a hole formed at the rotor, on the other hand, to ensure a defined angular position of the rotary part relative to the rotor. In this respect, the form fit is expediently present in a circumferential direction with respect to the input axis. The form-fitting element may in particular engage axially into the two holes with respect to the input axis and may then not leave them in a circumferential direction around the input axis.

If said fastening means are provided for connecting the rotary part to the rotor, the form-fitting element is provided in addition to them and differs from them in terms of its shape and its mode of operation. In particular, unlike the fastening means, the form-fitting element does not primarily have to serve to transmit a torque during operation of the electric motor. Rather, the form-fitting element is advantageously configured to fix the rotary part to the defined angular position relative to the rotor by engaging into said holes formed at the rotary part and at the rotor, if necessary even before the rotary part and the rotor are fixedly connected to one another for a common rotation. During the subsequent fixed connection for a reliable transmission of the rotation from the rotor to the rotary part, the angular position then no longer changes, but is at most also stabilized.

The rotary part and the rotor may, however, generally also be connected to one another solely by the form-fitting element. In this case, no additional fastening means are therefore provided to connect the rotary part to the rotor.

The two holes that are formed in the rotary part and the rotor, respectively, may each be a simple bore, for example. The holes may in this respect be formed as a passage bore or as a blind hole. One of the two holes may in particular be configured as a blind hole and the other as a passage bore. In particular if the holes are formed as simple bores, the form-fitting element may be configured as a dowel pin in accordance with an advantageous embodiment. Such a dowel pin preferably has a simple cylindrical shape (so-called cylindrical pin), wherein the edges may be rounded or may be provided with a chamfer. Alternatively to a configuration as a dowel pin, it is in particular possible to configure the form-fitting element as a clamping pin or as a fitting screw, wherein, in a configuration as a fitting screw, at least one of the holes is preferably formed as a threaded bore. The configuration as a dowel pin, a clamping pin, or a fitting screw enables a comparatively simple yet precise manufacture of the form-fitting element.

The form-fitting element may generally also be formed in multiple parts and may then engage in a form-fitting manner with one part into the hole formed at the rotary part and with another part into the hole formed at the rotor. The two parts may be directly connected to one another. Alternatively thereto, the form-fitting element may also comprise one or more further parts via which the two parts are connected to one another. For example, the form-fitting element may comprise an intermediate piece and two dowel pins fastened to the intermediate piece, one of which engages in a form-fitting manner into the hole formed at the rotary part and the other of which engages in a form-fitting manner into the hole formed at the rotor.

In accordance with a further advantageous embodiment, the form-fitting element is connected free of play both to the rotary part and to the rotor in a circumferential direction with respect to the input axis, namely in particular by said engagement into the respective hole. Due to the connection without play, no other precautions need to be taken to ensure that neither movements between the form-fitting element and the rotary part of the resolver nor movements between the form-fitting element and the rotor of the electric motor are possible in the circumferential direction around the input axis. Rather, the defined angular orientation between the rotary part and the form-fitting element as well as between the form-fitting element and the rotor, and thus also between the rotary part and the rotor, advantageously results directly from the engagement of the form-fitting element into the respective hole.

In accordance with a further advantageous embodiment, the form-fitting element is pressed, in each case with interference fit, into the hole formed at the rotary part and into the hole formed at the rotor. For this purpose, it may be expedient that the form-fitting element and the holes each have a circular cross-section. The resulting press fit of the form-fitting element engaging into the two holes may originally have caused the freedom from play described above or may at least significantly contribute thereto.

In general, to ensure the defined angular position of the rotary part relative to the rotor, a plurality of form-fitting elements may be provided that each engage in a form-fitting manner into a respective hole formed at the rotary part, on the one hand, and into a hole formed at the rotor, on the other hand. However, in accordance with a further advantageous embodiment, only exactly one form-fitting element of the kind described is preferably provided between the rotary part and the rotor. The form-fitting element may in particular differ from said fastening means in this regard. Due to such an embodiment, a bracing may be prevented from occurring between the form-fitting elements.

However, it may be expedient elsewhere to provide at least one further form-fitting element, in particular if the rotor of the electric motor is formed in multiple parts. The further form-fitting element may then serve to ensure a defined angular position of the parts of the rotor relative to one another.

In this regard, in accordance with a further advantageous embodiment, provision may be made that the rotor of the electric motor comprises, on the one hand, a rotor part, which cooperates with the stator (i.e. such that the electric motor interaction for generating the drive power between the stator and the rotor part takes place), and, on the other hand, an intermediate hub which is arranged radially within the rotor part with respect to the input axis and via which the rotor part is connected to the drive shaft, wherein the hole which is formed at the rotor and into which the form-fitting element engages is formed at the intermediate hub, and wherein the wheel side has a further form-fitting element that is arranged eccentrically with respect to the input axis and that engages in a form-fitting manner into a further hole formed at the intermediate hub, on the one hand, and into a hole formed at the rotor part, on the other hand, to ensure a defined angular position of the intermediate hub relative to the rotor part.

The intermediate hub and the rotor part are preferably not connected to one another solely by the further form-fitting element. Rather, it is preferred for the intermediate hub and the rotor part to be connected to one another for a common rotation by fastening means, such as screws, that differ from the form-fitting element in terms of their shape and their mode of operation. The connection then preferably takes place at a plurality of fastening points, in particular three or more fastening points, which are distributed in the circumferential direction around the input axis and at each of which a fastening means is provided. The fastening points may be substantially regularly distributed in this respect, but their arrangement preferably does not have any rotational symmetry so that the rotary part and the rotor may be connected to one another for a common rotation, by the fastening means, at least substantially in only one angular position relative to one another. The resulting imbalance is compensated in a design aspect.

For this further form-fitting element, corresponding further developments such as for the form-fitting element, which is provided between the rotary part and the rotor, may be advantageous for corresponding reasons. The further form-fitting element may in particular be configured as a dowel pin. The further form-fitting element is preferably connected without play both to the rotor part and to the intermediate hub in a circumferential direction with respect to the input axis. The further form-fitting element may be pressed, in each case with interference fit, into the further hole formed at the intermediate hub and into the hole formed at the rotor part. Furthermore, it is preferred if only exactly one such further form-fitting element is provided between the intermediate hub and the rotor part.

In accordance with a further advantageous embodiment, the resolver is arranged radially within the stator and axially within the axial extent of the stator with respect to the input axis. Such an arrangement of the resolver may contribute to a particularly compact design of the wheel side.

In accordance with a further advantageous embodiment, the drive shaft extends along the input axis from a first end, at which the drive shaft is connected to the rotor, to a second end to which the drive shaft transmits the drive power generated by the electric motor and outputs it to one of the further components of the wheel side, wherein the resolver is arranged in an axial extension of the drive shaft beyond the first end. The further components may, for example, be functional assemblies such as an offset gear, a reduction gear unit or the like. In this respect, the connection of the drive shaft to the rotor does not necessarily have to take place completely at the margin of the axial extent of the drive shaft, but rather takes place in the region of the first end, which may comprise an entire first end section of the drive shaft. In a corresponding manner, the drive shaft does not have to cooperate with the respective further component of the wheel side entirely at the opposite margin of its axial extent, but cooperates with the respective further component in the region of its second end, which may comprise an entire second end section of the drive shaft.

Due to the arrangement described, with respect to the input axis, the resolver is arranged just opposite that component which is connected to the electric motor by the drive shaft. Such an arrangement may also contribute to a compact design of the wheel side. Moreover, the resolver may thereby be particularly easy to access. Furthermore, the resolver may be arranged particularly close to the electric motor due to an arrangement in the region of the first end of the drive shaft and may thereby particularly directly detect the angular position of the rotor.

The invention also relates to a portal axle for a motor vehicle, comprising two wheel sides of the explained kind that are connected to one another via an axle bridge. Such portal axles are in particular used in low-floor buses, for example in local transport and city buses, where as large as possible a free space (with respect to the vertical depth and also the horizontal width) is desired for the passengers.

The invention will be further explained by way of example with reference to the Figures in the following.

Figure 2:
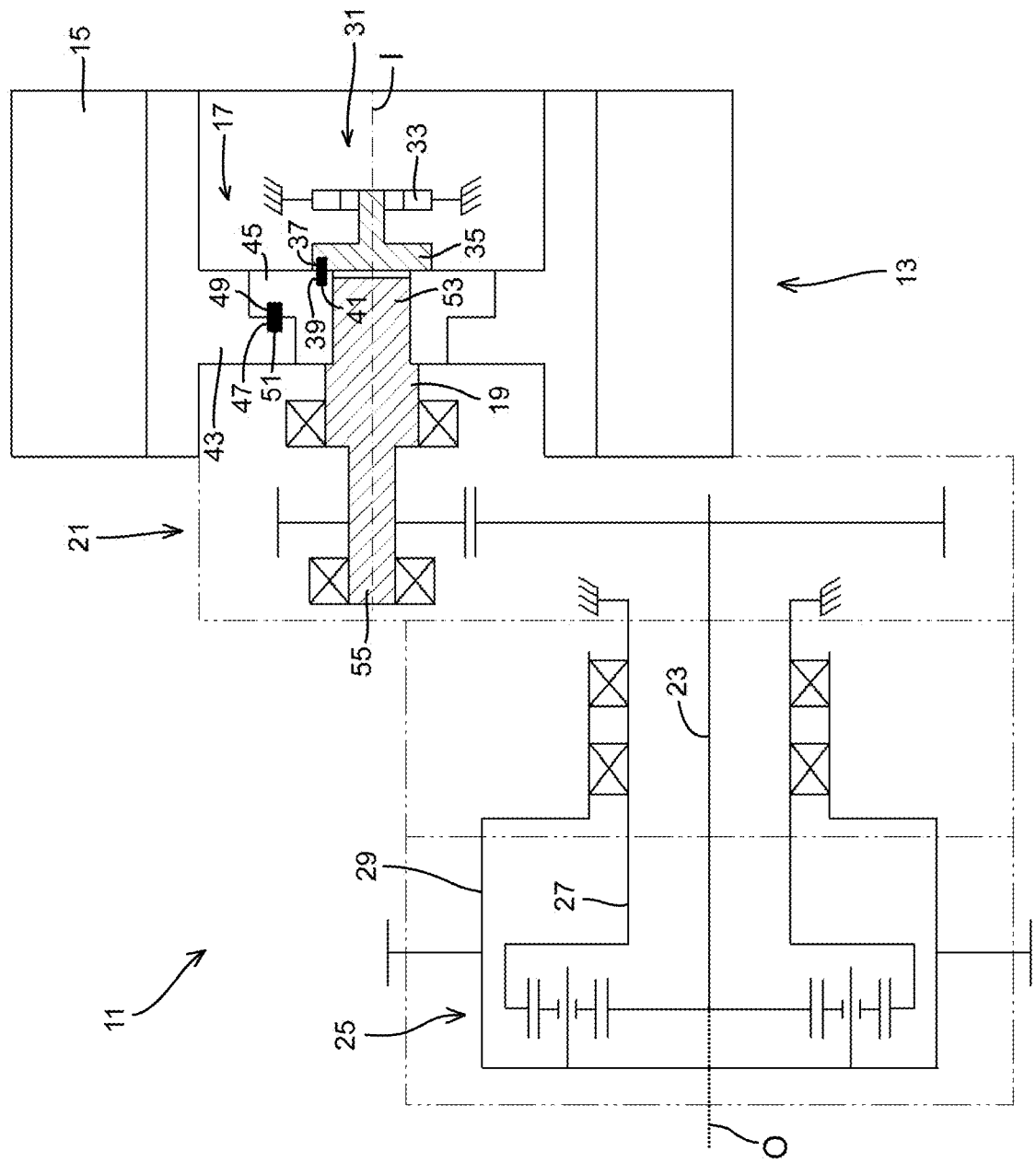

FIG. 1 shows a first embodiment of a wheel side in accordance with the invention in a very simplified schematic representation; and FIG. 2 shows a second embodiment of a wheel side in accordance with the invention in a very simplified schematic representation.

The wheel side 11 shown in FIG. 1 is configured in accordance with a first embodiment of the invention and comprises an electric motor 13, which has a stationary stator 15 and a rotor 17 rotatable relative to the stator 15, and a drive shaft 19 that extends along an input axis I from a first end 53 to a second end 55 and that is connected at the first end 53 to the rotor 17 of the electric motor 13 for a common rotation about the input axis I so that, on a rotation of the rotor 17, said drive shaft 19 likewise rotates in the same direction of rotation and at the same rotational speed as the rotor 17.

The wheel side 11 further comprises an offset gear 21, which is configured as a simple spur gear set, a driven shaft 23, a wheel hub gear 25 configured as a reducing planetary gear set, a hub carrier 27, and a wheel hub 29. The drive shaft 19 is connected at its second end 55 to a drive gear of the offset gear 21. A driven gear of the offset gear 21 meshing therewith is connected to one end of the driven shaft 23 whose other end is connected to a sun gear of the wheel hub gear 25. A planetary carrier of the wheel hub gear 25 is connected to the wheel hub 29 that is rotatably supported at the hub carrier 27 at which a ring gear of the wheel hub gear 25 is also formed. Due to this design, a driving torque generated by the electric motor 13 is transmitted by the drive shaft 19 along the input axis I to the offset gear 21 by which it is displaced to an output axis O along which it is then further transmitted from the driven shaft 23 via the wheel hub gear 25 to the wheel hub 29.

The offset gear 21 could generally also have a multi-stage or more complex design. Furthermore, the wheel hub gear 25 could also be missing so that the driven shaft 23 directly connects the offset gear 21 to the wheel hub 29.

The wheel side 11 further has a resolver 31 that comprises a non-moving stationary part 33 and a rotary part 35 rotatable relative to the stationary part 33 and that is configured to output a corresponding signal in dependence on the angular position of the rotary part 35 relative to the stationary part 33. The rotary part 35 is in this respect connected to the rotor 17 of the electric motor 13 for a common rotation so that the angular position of the rotor 17 relative to the stator of the electric motor 13 may be detected by means of the resolver 31.

The resolver 31 is arranged in an axial extension of the drive shaft 19 beyond its first end 53 with respect to the input axis I. In this respect, the resolver 31 is located radially within the stator 15 and axially within the axial extent of the stator of the electric motor 13. The rotary part 35 of the resolver 31 is thereby arranged axially adjacent to the rotor 17.

A respective hole 37 or 39 is formed in both the rotary part 35 and the rotor 17. The two holes 37, 39, which are each formed as blind holes, extend opposite one another in an axial direction with respect to the input axis I, are arranged at a corresponding radial spacing from the input axis I, and have matching cross-sections, namely circular cross-sections in the exemplary first embodiment.

As a result, a form-fitting element 41 configured as a simple dowel pin may axially engage into the hole 37 formed at the rotary part 35, on the one hand, and into the hole 39 formed at the rotor 17, on the other hand, whereby a form fit in the circumferential direction around the input axis I results. In this respect, the form-fitting element 41 is pressed into the holes 37, 39 with interference fit in each case so that the rotary part 35 of the resolver 31 and the rotor 17 of the electric motor 13 are fixed to a defined angular position relative to one another by the form-fitting element 41.

The angular position of the rotary part 35 relative to the rotor 17 that is mechanically reliably defined in this manner allows a simple removal and reinstallation of the resolver 31, for example in the event of maintenance, without a time-consuming calibration thereby being necessary. This is because the connection between the rotary part 35 and the rotor 17 may in this respect be easily severed in the axial direction and may subsequently be re-established with the same defined angular position. It is generally also conceivable to make the holes 37, 39 so precise that even an initial calibration may be omitted.

The second embodiment shown in FIG. 2 largely corresponds to the first embodiment shown in FIG. 1 so that the same reference numerals are used in both Figures and a description of the corresponding parts is omitted. The difference between the second embodiment and the first embodiment is that the rotor 17 of the electric motor 13 is formed in one part in the first embodiment and in two parts in the second embodiment, namely comprising a rotor part 43 and an intermediate hub 45. In this respect, the rotor part 43 cooperates with the stator 15 and is connected to the drive shaft 19 via the intermediate hub 45 that is arranged radially within the rotor part 43 with respect to the input axis I. Said hole 39 formed at the rotor 17 is in this respect formed at the intermediate hub 45.

The rotor part 43 and the intermediate hub 45 each have a flange section and axially contact one another with their flange sections. Along this contact surface, the rotor part 43 and the intermediate hub 45 are screwed to one another (not shown) at a plurality of fastening points that are distributed in the circumferential direction around the input axis I. The rotor part 43 and the intermediate hub 45 are in this respect configured such that the intermediate hub 45 (after loosening the screw connection) may be released from the rotor part 43 in the axial direction with respect to the input axis I in which the drive shaft 19 faces with its first end 53. In this way, for example for maintenance, for instance for the replacement of a seal, regions of the wheel side 11 that are otherwise difficult to access may be made axially accessible through the rotor part 43 by removing the resolver 31 and the intermediate hub 45.

A hole 47 is formed at the rotor part 43, namely in its flange section, and a further hole 49 is formed at the intermediate hub 45, namely in its flange section. Similar to the holes 37, 39, these two holes 47, 49, which are in turn each formed as a blind hole, extend opposite one another in the axial direction with respect to the input axis I, are arranged at a corresponding radial spacing from the input axis I, and have matching cross-sections, namely circular cross-sections in the exemplary second embodiment.

The wheel side 11 configured in accordance with the second embodiment comprises a further form-fitting element 51 that engages in a form-fitting manner into the hole 47 formed at the rotor part 43, on the one hand, and into the further hole 49 formed at the intermediate hub 45, on the other hand, so that a defined angular position between the rotor part 43 and the intermediate hub 45 is thereby ensured. Thus, in the second embodiment, despite the two-part design of the rotor 17, a defined angular position of the rotary part 35 of the resolver 31 relative to the rotor part 43 of the rotor 17 of the electric motor 13 cooperating with the stator 15 is nevertheless achieved overall by the two form-fitting elements 41, 51.

REFERENCE NUMERALS

11 wheel side
13 electric motor
15 stator
17 rotor
19 drive shaft
21 offset gear
23 driven shaft
25 wheel hub gear
27 hub carrier
29 wheel hub
31 resolver
33 stationary part
35 rotary part
37 hole
39 hole
41 form-fitting element
43 rotor part
45 intermediate hub
47 hole
49 further hole
51 further form-fitting element
53 first end
55 second end
I input axis
O output axis

The invention claimed is:
1. A wheel side comprising:
an electric motor that comprises a stator and a rotor;
a drive shaft that is connected to the rotor for a same rotation about an input axis so that a drive power generated by the electric motor is output to further components of the wheel side via the drive shaft; and
a resolver that detects the angular position of the rotor and that comprises a stationary part and a rotary part that is connected to the rotor of the electric motor for a same rotation about the input axis,
wherein the resolver is formed separately from the electric motor, wherein the wheel side has a form-fitting element that is arranged eccentrically with respect to the input axis and that engages in a form-fitting manner into a hole formed at the rotary part, on the one hand, and into a hole formed at the rotor, on the other hand, to ensure a defined angular position of the rotary part relative to the rotor, wherein the rotor of the electric motor comprises a rotor part that cooperates with the stator, and an intermediate hub that is arranged radially within the rotor part with respect to the input axis and via said intermediate hub the rotor part is connected to the drive shaft, wherein the hole which is formed at the rotor and into which the form-fitting element engages is formed at the intermediate hub, and wherein the wheel side has a further form-fitting element that is arranged eccentrically with respect to the input axis and that engages in a form-fitting manner into a further hole formed at the intermediate hub, on the one hand, and into a hole formed at the rotor part, on the other hand, to ensure a defined angular position of the intermediate hub relative to the rotor part.

2. A wheel side comprising:
an electric motor that comprises a stator and a rotor;
a drive shaft that is connected to the rotor for a same rotation about an input axis so that a drive power generated by the electric motor is output to further components of the wheel side via the drive shaft; and
a resolver that detects the angular position of the rotor and that comprises a stationary part and a rotary part that is connected to the rotor of the electric motor for a same rotation about the input axis,
wherein the resolver is formed separately from the electric motor,
wherein the wheel side has a form-fitting element that is arranged eccentrically with respect to the input axis and that engages in a form-fitting manner into a hole formed at the rotary part, on the one hand, and into a hole formed at the rotor, on the other hand, to ensure a defined angular position of the rotary part relative to the rotor, and
wherein only exactly one such form-fitting element is provided between the rotary part and the rotor.

3. The wheel side according to claim 2,
wherein the form-fitting element is configured as a dowel pin, a clamping pin, or a fitting screw.

4. The wheel side according to claim 2,
wherein the form-fitting element is connected free of play both to the rotary part and to the rotor in a circumferential direction with respect to the input axis.

5. The wheel side according to claim 2,
wherein the form-fitting element is pressed into the hole formed at the rotary part with interference fit and is pressed into the hole formed at the rotor with interference fit.

6. The wheel side according to claim 2,
wherein the rotor of the electric motor comprises a rotor part that cooperates with the stator, and an intermediate hub that is arranged radially within the rotor part with respect to the input axis and via said intermediate hub the rotor part is connected to the drive shaft,
wherein the hole that is formed at the rotor and into which the form-fitting element engages is formed at the intermediate hub, wherein the form-fitting element engages into the hole that is formed at the rotor and is formed at the intermediate hub, and
wherein the wheel side has a further form-fitting element that is arranged eccentrically with respect to the input axis and that engages in a form-fitting manner into a further hole formed at the intermediate hub, on the one hand, and into a hole formed at the rotor part, on the other hand, to ensure a defined angular position of the intermediate hub relative to the rotor part.

7. The wheel side according to claim 2,
wherein the resolver is arranged radially within the stator with respect to the input axis and axially within the axial extent of the stator.

8. The wheel side according to claim 2,
wherein the drive shaft extends along the input axis from a first end to a second end, wherein the drive shaft is connected to the rotor at the first and end and wherein the drive shaft transmits the drive power generated by the electric motor at the second end and outputs the power to one of the further components of the wheel side,
and wherein the resolver is arranged in an axial extension of the drive shaft beyond the first end.

9. The wheel side according to claim 2,
wherein the resolver can be removed from the wheel side separately from the electric motor.

10. The wheel side according to claim 2,
wherein the stationary part of the resolver is supported independently of the electric motor.

11. The wheel side according to claim 2,
wherein the wheel side is a first wheel side installed in a portal axle, wherein a second wheel side having same features as the first wheel side is installed in the portal axle,
wherein the first wheel side and the second wheel side are connected to one another via an axle bridge.

* * * * *